Sept. 8, 1942.   C. E. FEHRINGER ET AL   2,294,971
FISH LURE
Filed Feb. 19, 1940
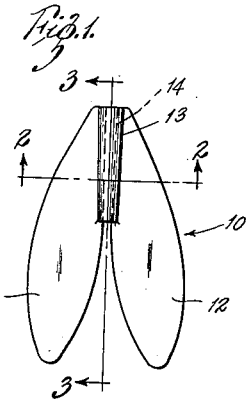
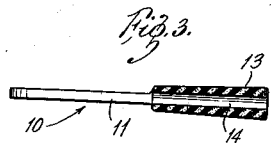
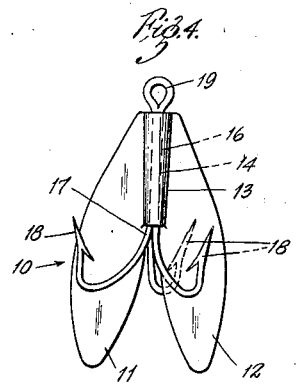
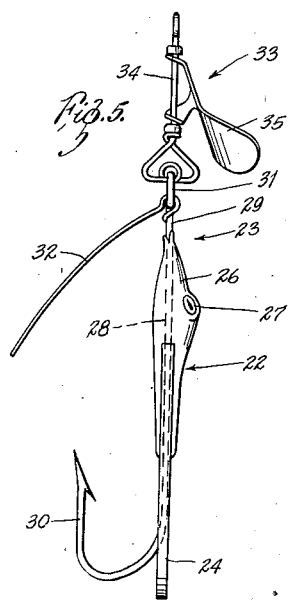
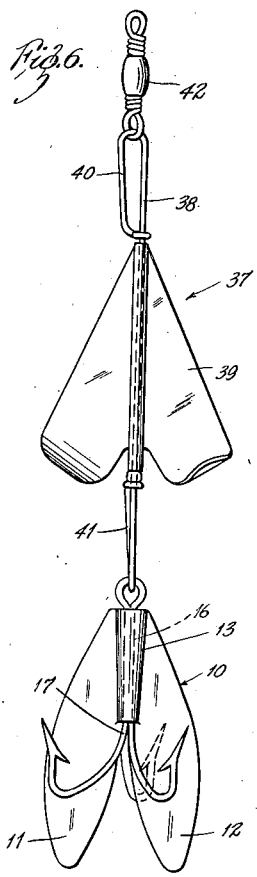
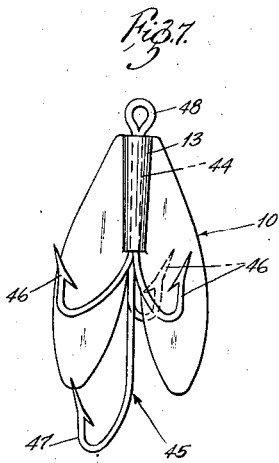
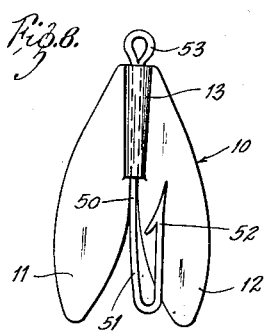
INVENTORS
CHARLES E. FEHRINGER,
CLETUS L. FEHRINGER,
By Lawrence C. Kingsland
ATTORNEY.

Patented Sept. 8, 1942

2,294,971

UNITED STATES PATENT OFFICE 2,294,971

FISH LURE

Charles E. Fehringer, East St. Louis, and Cletus L. Fehringer, Dupo, Ill.

Application February 19, 1940, Serial No. 319,622

1 Claim. (Cl. 43—42)

The present invention relates generally to devices for catching fish, and more particularly to a fish lure which is effective under a wide range of fishing circumstances.

An object of the present invention is to provide a novel fish lure which is adapted to be used in various types of fishing.

Another object is to provide a novel fish lure which is of a configuration to simulate the tail of a fish, and of a construction to resist the strike of a fish.

Another object is to provide a novel fish lure attachment which is adapted to be used with a wide variety of hooks.

Another object is to provide a novel fish lure which is simple in construction and, in one adaptation, involves a hook and an element resembling the tail of a fish.

Another object is to provide a novel fish lure which is simple and light in construction, yet effective in its fish luring characteristics.

Other objects and advantages will be apparent from the following description, taken in conjunction with the accompanying drawing, in which:

Fig. 1 is a plan view of a fish lure attachment constructed in accordance with the teachings of the present invention;

Fig. 2 is a section on the line 2—2 of Fig. 1;

Fig. 3 is a section on the line 3—3 of Fig. 1;

Fig. 4 is a plan view of the fish lure attachment shown in Fig. 1 and a three-prong fishing hook;

Fig. 5 is a side view of a modified fish lure attachment in conjunction with other elements forming a weedless fly;

Fig. 6 is a plan view of a fishing device incorporating the fish lure attachment shown in Fig. 1;

Fig. 7 is a plan view of the present fish lure attachment in operative combination with a novel hook; and, Fig. 8 is a plan view of the present fish lure attachment and a single hook.

Referring to the drawing more particularly by reference numerals, 10 indicates generally a fish lure attachment constructed in accordance with the concepts of the present invention (Figs. 1–3). The fish lure attachment 10 comprises wings or tail spreads 11 and 12 of a configuration to simulate the tail of a fish, the wings 11 and 12 being connected by a central annular portion 13 having a bore 14 therethrough. The fish lure attachment 10 is of rubber and is preferably white, although the color scheme may be varied for particular circumstances.

In Fig. 4, the fish lure attachment 10 is shown disposed on the shank 16 of a hook 17 having three barbed prongs 18 and a threading eyelet 19. The fish lure attachment 10 is slipped onto the hook 17, the eye 19 sliding through the bore 14. The material of which the fish lure attachment 10 is constructed stretches to permit the eye 19 to pass through the bore 14.

In Fig. 5, a modified fish lure attachment 22 is shown. In the fly assemblage 23, the fish lure attachment 22 includes a wing 24 and a wing 25 (not shown) similar to the wings 11 and 12 of the fish lure attachment 10. The fish lure attachment 22 further includes a head portion 26 having an eye 27 and a longitudinal bore 28. The fish lure attachment 22 is mounted by the bore 28 in the head portion 26 on a single hook 29 having a barb 30 and an eye 31. A weed spring 32 and a spinner assemblage 33 are connected to the eye 31. The spinner assemblage 33 includes a support 34 and a spinner element 35, the spinner element 35 being adapted to rotate about the support 34.

In Fig. 6, the fish lure attachment 10 is shown disposed about the shank 16 of a three-prong hook 17 and attached to a spinner assemblage 37. The spinner assemblage 37 includes a support 38 and a spinner element 39, the latter being adapted to rotate about the former as an axis. The support 38 includes a forward latch 40 and a rear latch 41. A conventional swivel connection 42 is connected to the forward latch 40 of the support 38.

In Fig. 7, the fish lure attachment 10 is shown disposed about the shank 44 of a novel four-barb hook 45 to provide a novel assemblage. The hook 45 includes three barbs 46 disposed adjacent the rearward termination of the annular portion 13, and a fourth barb 47 disposed adjacent the rearward tips of the wings 11 and 12. The barbs 46 and the barb 47 are preferably constructed as a single unit, being welded or otherwise connected at the juncture. An eye 48 provides means for attaching the assemblage to a line, to a spinner assemblage, or the like.

In Fig. 8, the fish lure attachment 10 is shown mounted on the shank 50 of a single hook 51. The single hook 51 includes a single barb 52 and an eye 53.

Operation

As is clear from the foregoing description, taken in conjunction with the accompanying drawing, the present fish lure attachment 10 or 22 is adapted to be used in many types and kinds of fishing. It can be slipped over the eye and onto the shank of any kind of hook and can be employed in combination with spinners and other devices employed to comprise fish lures. The bore 14 maintains the attachment 10 firmly on a hook due to the extensive engaging surface, so that it is difficult for a fish to rip it from a hook.

The present fish lure attachment 10 may be employed as the major portion of a surface fishing device, as is shown in Fig. 6. This device is drawn rapidly over the surface of the water, the spinner element 39 of the spinner assemblage 37 making a whirring noise in its rapid progress. The fish lure attachment 10 serves as the portion of the assemblage which attracts the eye of the fish. The light weight of the attachment 10 renders it advantageous for casting.

In fishing among weeds, the fish lure attachment 10 or 22 can be employed as the attractive portion of a weedless fishing assemblage, as is shown in Fig. 5. This device can be drawn down among the weeds without snagging.

The fish lure attachment 10 can be used advantageously with the simple three-barbed hook 17 (Fig. 4). This assemblage serves as an effective fish lure when attached to the end of a pole and rapidly moved up and down in the water, the downward movement being assisted by a weight, if preferred. It may be swished about in a hole to resemble a school of small fish. This assemblage can also be drawn over the surface of the water.

The present fish lure attachment 10 also finds effective use when employed with the four-barbed hook 45 (Fig. 7), for fish striking at the assemblage, missing the three barbs 46, will catch or be caught by the trailing barb 47. This assemblage has been found to be capable of use under a wide variety of fishing circumstances.

In summation, it is apparent that the present fish lure attachment 10, in its ramifications of use, serves in any of the three capacities by which fish are caught. That is, it can be employed to anger the fish, to arouse their curiosity, or to appear to them as satisfactory food. Since these are the three means by which the majority of fish are caught, the present fish lure attachment 10 is highly efficient.

The present fish lure attachment 10 can be molded as an integral unit, or constructed of several layers of superposed material welded together. Rubber has been found to be the preferred material, but equivalent materials are within the contemplated scope of the present invention. Rubber has been found to resist damage from the striking of the fish. The particular configuration disclosed for the fish lure attachment 10 is a preferred one, but other fish tail simulations are intended as within the scope of the present invention.

It is apparent that there has been provided a fish lure attachment which is adapted to fulfill all of the objects and advantages sought therefor. It is to be understood that the fore-description and accompanying drawing have been given by way of illustration and example, and not for purposes of limitation, the invention being limited only by the claim which follows:

What is claimed is:

In combination, a fish hook including a shank, a plurality of barbs disposed in the same relationship to the shank and a single barb disposed rearwardly of the first barbs, and an integral fish lure device of rubber including a central portion disposed about the shank of the hook, said device including a pair of spaced wings connected to the central portion and extending laterally and rearwardly past and beyond the group of barbs to the single barb.

CLETUS L. FEHRINGER.
CHARLES E. FEHRINGER.